United States Patent
Lee et al.

(10) Patent No.: US 7,092,688 B2
(45) Date of Patent: Aug. 15, 2006

(54) METHOD FOR DIRECTLY INDICATING THE STRENGTH OF A SIGNAL AND THE DEVICE THEREOF

(75) Inventors: E Tay Lee, Taoyuan (TW); Ching Lung Chen, Tainan (TW); Chung Ping Chang, Tainan (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 407 days.

(21) Appl. No.: 10/234,369

(22) Filed: Sep. 5, 2002

(65) Prior Publication Data

US 2004/0203549 A1    Oct. 14, 2004

(30) Foreign Application Priority Data

May 7, 2002    (TW) ................... 91109643 A

(51) Int. Cl.
*H04B 17/00*    (2006.01)

(52) U.S. Cl. ................... 455/226.2; 455/558

(58) Field of Classification Search ............ 455/226.1, 455/226.2, 226.4, 67.11, 67.7, 556.1, 557, 455/558, 550.1
See application file for complete search history.

(56) References Cited

U.S. PATENT DOCUMENTS

| | | | | |
|---|---|---|---|---|
| 5,239,684 A | * | 8/1993 | Ishikura ................ | 455/67.7 |
| 5,598,418 A | * | 1/1997 | Lo et al. ................ | 370/501 |
| 5,703,607 A | * | 12/1997 | Tai ................ | 345/34 |
| 5,890,057 A | * | 3/1999 | Dutkiewicz et al. ...... | 455/69 |
| 5,950,139 A | * | 9/1999 | Korycan ................ | 455/566 |
| 6,148,180 A | * | 11/2000 | Sato ................ | 455/67.7 |
| 6,211,858 B1 | * | 4/2001 | Moon et al. ............ | 715/771 |
| 6,236,382 B1 | * | 5/2001 | Kawakami et al. ....... | 345/83 |

FOREIGN PATENT DOCUMENTS

WO    WO 01/48612 A1 *   7/2001

* cited by examiner

*Primary Examiner*—Nguyen T. Vo
(74) *Attorney, Agent, or Firm*—Rosenberg, Klein & Lee

(57) ABSTRACT

A wireless communication device includes multiple properly arranged indication members. Thus, the indication members may be operated corresponding to the strength of the local RF (radio frequency) signal, so that the user may directly learn the strength of the local RF signal easily, rapidly and instantaneously, so as to decide whether to transmit or receive the data or not, or to take other procedures, thereby preventing from incurring unnecessary time consumption, and thereby enhancing the working efficiency. In addition, the method for directly indicating the strength of a signal for a wireless communication device includes the steps of: querying a signal strength value; determining a control value according to the signal strength value; and using the control value to control operation of the multiple indication members.

6 Claims, 4 Drawing Sheets

METHOD FOR DIRECTLY INDICATING THE STRENGTH OF A SIGNAL AND THE DEVICE THEREOF

BACKGROUND OF THE INVENTION

1. Field of the Invention

The present invention relates to a method for directly indicating the strength of a signal and the device thereof, and more particularly to a method for directly indicating the strength of a signal and the device thereof, wherein the indication members may be operated corresponding to the strength of the local RF (radio frequency) signal.

2. Description of the Related Art

A conventional wireless network card in accordance with the prior art shown in FIG. 4 may be inserted into a notebook computer, and comprises multiple indication lights "A" for indicating the states of the conventional wireless network card, such as the state of power supply, the transmitting state, the receiving state or the like, so that the user may learn the whole operation situation of the conventional wireless network card. However, the indication lights "A" cannot indicate the strength of the local RF (radio frequency) signal, so that when the local RF signal is very weak, the user cannot instantly get the poor conditions of transmitting and receiving the wireless signals until he learns that the data of the conventional wireless network card cannot be transmitted or received, thereby consuming much time, and thereby causing inconvenience to the user.

SUMMARY OF THE INVENTION

The present invention has arisen to mitigate and/or obviate the disadvantage of the conventional wireless network card.

The primary objective of the present invention is to provide a method for directly indicating the strength of a signal and the device thereof, wherein the indication members may be operated corresponding to the strength of the local RF (radio frequency) signal, so that the user may directly learn the strength of the local RF signal easily, rapidly and instantaneously in a direct viewing manner, so as to decide whether to transmit or receive the data or not, or to take other procedures, thereby preventing from incurring unnecessary time consumption, and thereby enhancing the working efficiency.

In accordance with one aspect of the present invention, there is provided a method for directly indicating the strength of a signal for a wireless communication device, the wireless communication device being provided with multiple indication members, the method comprising the steps of:

(a) querying a signal strength value;

(b) determining a control value according to the signal strength value; and (c) using the control value to control operation of the multiple indication members.

In accordance with another aspect of the present invention, there is provided a method for directly indicating the strength of a signal for a wireless network card using a PCMCIA interface, the wireless network card being provided with multiple indication members, the method comprising the steps of:

(a) initializing the wireless network card, and allocating multiple I/O address spaces;

(b) querying the information records of the medium access control (MAC) layer of the PCMCIA interface, to obtain a signal strength value;

(c) determining a control value according to the signal strength value; and (d) sending the control value to the multiple I/O address spaces, to control operation of the multiple indication members.

In accordance with a further aspect of the present invention, there is provided a wireless communication device for directly indicating the strength of a signal, comprising multiple properly arranged indication members that may be operated corresponding to a strength of a local RF (radio frequency) signal.

Preferably, the wireless communication device is a wireless network card supporting a PCMCIA interface, and may provide a signal strength value to determine a control value.

Further benefits and advantages of the present invention will become apparent after a careful reading of the detailed description with appropriate reference to the accompanying drawings.

DETAILED DESCRIPTION OF THE INVENTION

Figure 1:
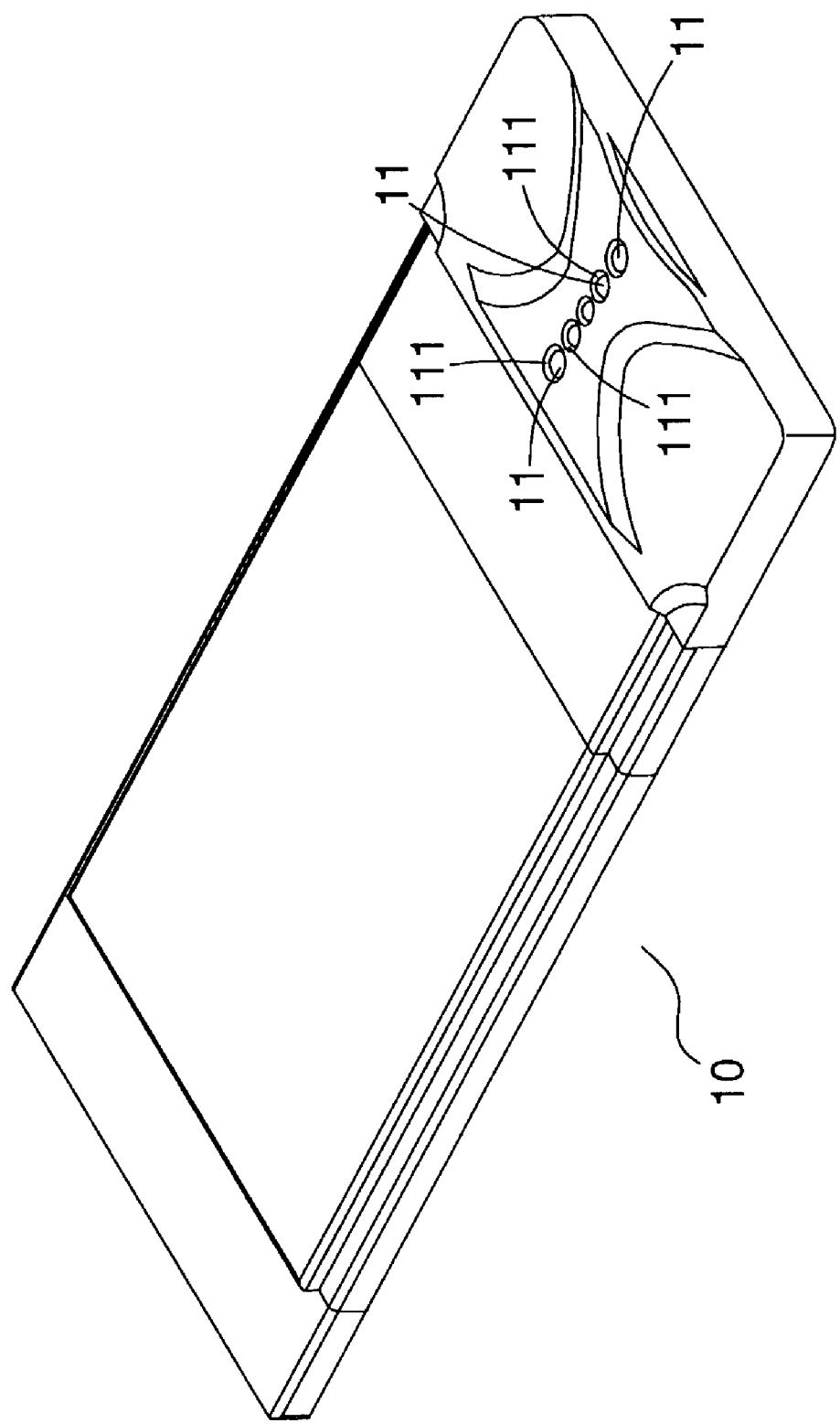
FIG. 1 is a perspective view of a device in accordance with a preferred embodiment of the present invention.

Referring to the drawings and initially to FIG. 1, a device for directly indicating the strength of a signal in accordance with a preferred embodiment of the present invention is available for a wireless network card (wireless LAN card or wireless PC card) using a PCMCIA (personal computer memory card industry association) interface.

The PCMCIA wireless network card 10 is provided with multiple properly arranged indication members 11 (such as LED) that may be operated corresponding to the strength of the local RF (radio frequency) signal. For example, when the local RF signal is strong, all of the indication members 11 will indicate or light, and when the local RF signal is weak, only some of the indication members 11 will indicate or light. When the local RF signal is very weak so that the data cannot be transmitted or received, all of the indication members 11 will not indicate or become dark. Thus, the indication of the indication members 11 may be changed according to the strength of the local RF signal, so that the user may directly learn the strength of the local RF signal easily, rapidly and instantaneously in a direct viewing manner, so as to decide whether to transmit or receive the data or not, or to take other procedures, thereby preventing from incurring unnecessary time consumption, and thereby enhancing the working efficiency.

Preferably, the indication members 11 may be arranged in a linear manner, and each of the indication members 11 has an indication zone 111. The sizes of the indication zones 111 are increased from a middle toward the two sides.

Further, the indication of the indication members 11 may be changed according to the strength of the local RF signal by using the following method.

Figure 2:
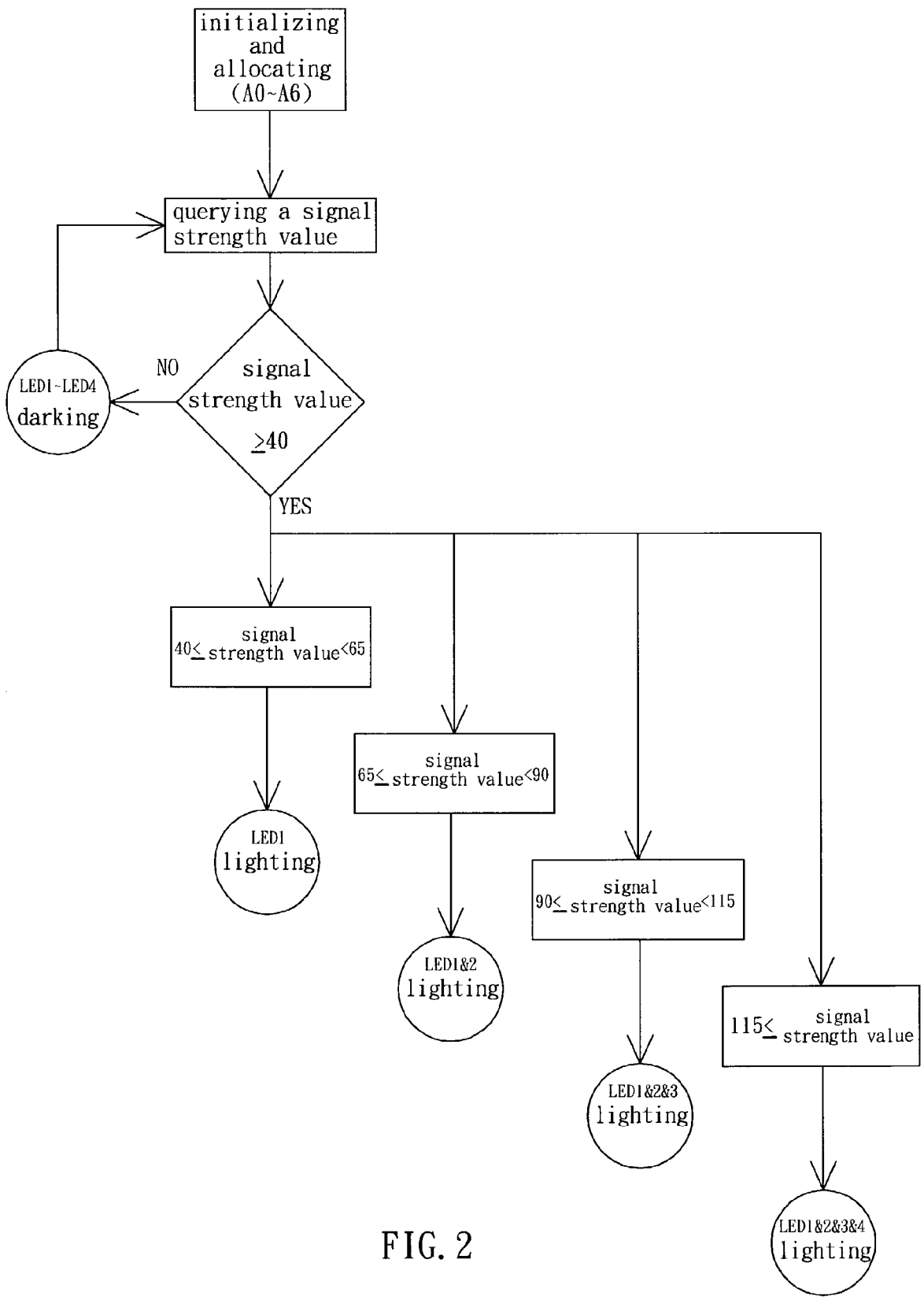
FIG. 2 is a flow chart of a method in accordance with a preferred embodiment of the present invention.

Referring to FIG. 2, a method for directly indicating the strength of a signal in accordance with a preferred embodiment of the present invention is available for a wireless network card (wireless LAN card or wireless PC card) using a PCMCIA interface.

Figure 3:
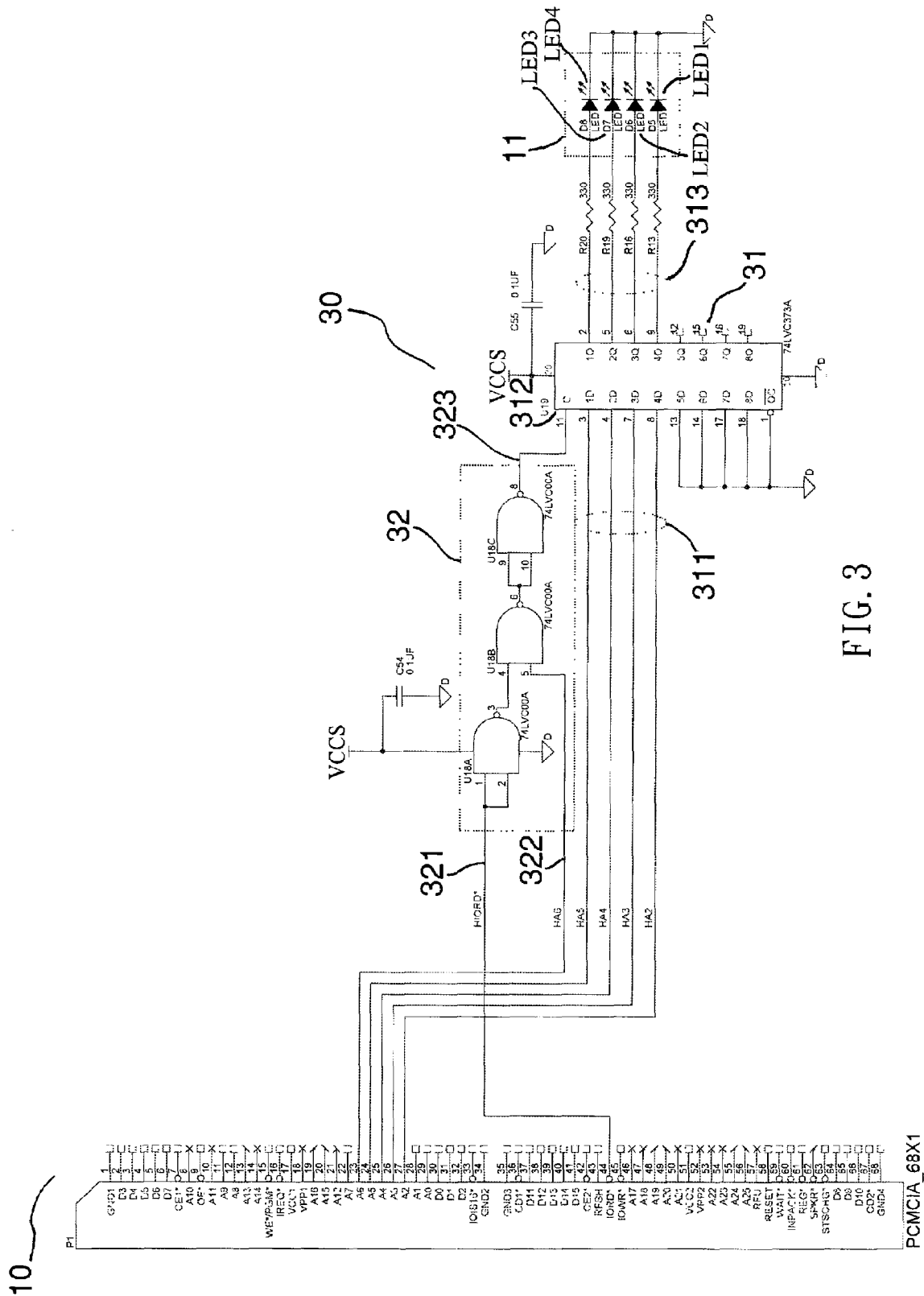
FIG. 3 is a circuit diagram of the device in accordance with the preferred embodiment of the present invention.
Figure 4:
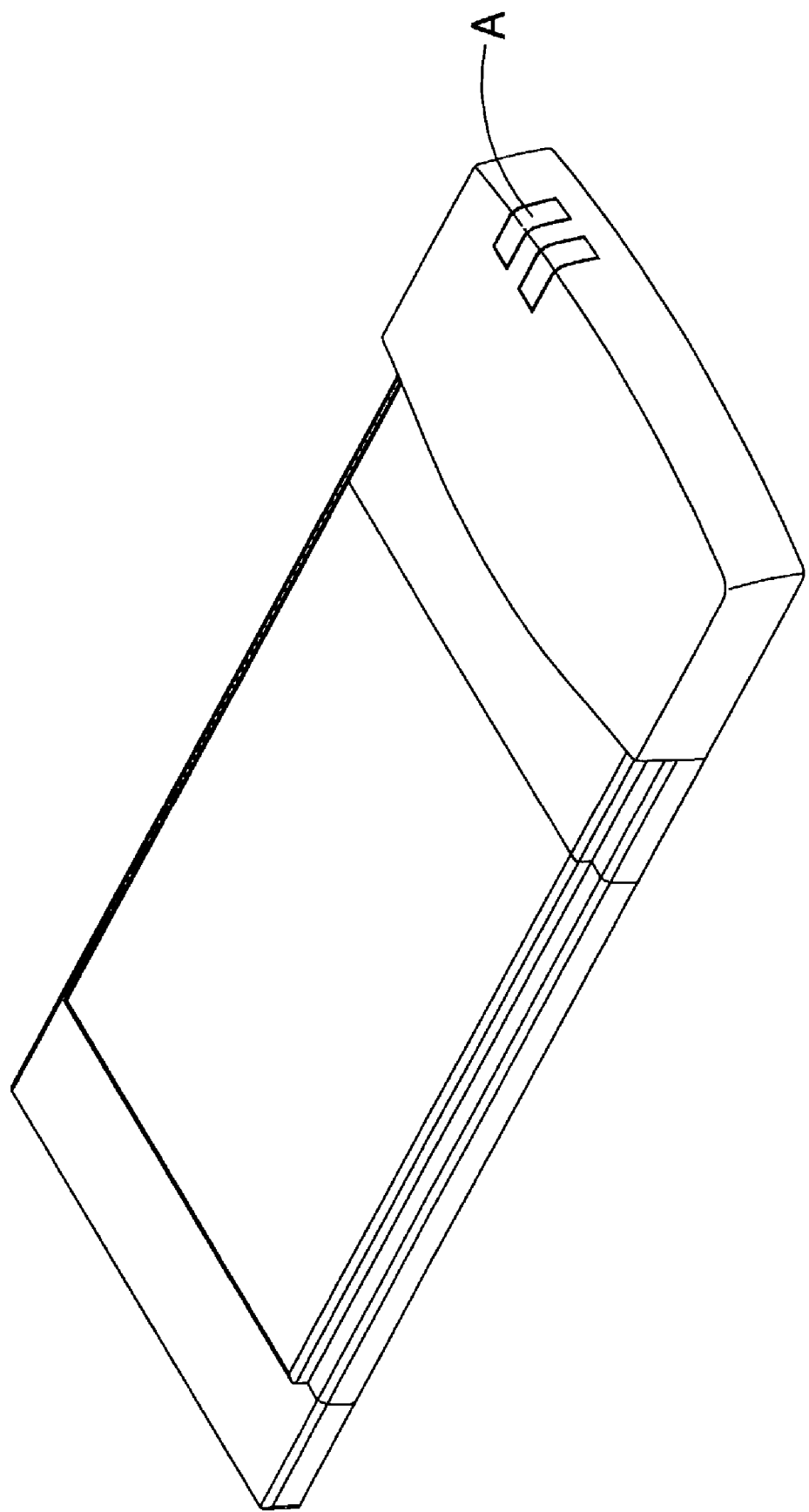
FIG. 4 is a perspective view of a conventional wireless network card in accordance with the prior art.

The method comprises the following steps:

(a) initializing the wireless network card, and allocating multiple I/O address spaces A0 to A6 (see FIG. 3);

(b) querying the information records of the medium access control (MAC) layer of the PCMCIA interface, to obtain the signal strength value;

(c) determining a control value according to the signal strength value; and (d) sending the control value to the multiple I/O address spaces, to control operation of one indication member or multiple indication members.

In the step (b), the method may query the resource ID (RID) of one identification number of the MAC layer of the PCMCIA interface, to obtain the corresponding parameter, i.e., the signal strength value. The parameter may be changed according to the strength of the RF signal detected by the hardware, so that the parameter may be used to judge the strength of the RF signal.

In the step (c), the method may preset the range of multiple values, and may compare the magnitude of the multiple values, to judge the range of the signal strength value of each query, so as to determine the corresponding control value.

As shown in FIG. 2, the measured range is between 40 and 115, and includes four grades each having a difference value of 25.

In such a manner, the method first judges if the signal strength value is greater than or equal to 40. If the signal strength value is smaller than 40, the method may determine a first control value, so that all of the indication members (LEDs) will not indicate or become dark.

If the signal strength value is greater than or equal to 40, the method will proceed a further judgement as follows.

If the signal strength value is located in the range between 40 and 65, the method may determine a second control value, so that the LED1 will indicate or light.

If the signal strength value is located in the range between 65 and 90, the method may determine a third control value, so that the LED1 and LED2 will indicate or light.

If the signal strength value is located in the range between 90 and 115, the method may determine a fourth control value, so that the LED1, LED2 and LED3 will indicate or light.

If the signal strength value is greater than or equal to 115, the method may determine a fifth control value, so that all of the LEDs (LED1, LED2, LED3 and LED4) will indicate or light.

Referring to FIG. 3, the device in accordance with the preferred embodiment of the present invention comprises a drive circuit 30 for driving the indication members 11. The drive circuit 30 includes a buffer 31 which includes a first input port 311 for inputting the control value, a second input port 312 for inputting an enabling signal, and an output port 313 for connecting to the indication members 11 (LED1, LED2, LED3 and LED4). Thus, the buffer 31 may decide the number of the indication members 11 to be driven according to the enabling signal and the control value. That is, when the enabling signal has a high potential, the buffer 31 may release the locked control values (A2 to A5), so that the output port 313 may output the current to light one LED or multiple LEDs. For example, when the signal strength value is located in the range between 65 and 90, the enabling signal has a high potential, so that the control value of "0011" may be determined. At this time, by enabling of the buffer 31, the output port 313 may output the control value of "0011", to supply the electric power to light the LED1 and LED2.

The enabling signal may be obtained from an information reading leg "IORD" (see FIG. 3) of the wireless network card 10. The potential of the information reading leg is determined by the signal transmitting and receiving conditions of the wireless network card 10. When the wireless network card 10 is transmitting or receiving the signal, the information reading leg has a high potential, so that the enabling signal has a high voltage. Thus, the buffer 31 may be enabled, so that if the control value is not "0000", at least one of the LED1, LED2, LED3 and LED4 will light.

On the other hand, the first input port 311 possibly needs to use other legs having other functions. For example, the legs A2 to A5 used by the first input port 311 have other functions. At this time, the drive circuit 30 further includes a judgement device 32 so that the legs A2 to A5 may be switched to transmit the control value. The judgement device 32 may input a first judgement signal 321 and a second judgement signal 322, so that the judgement device 32 may output an enabling signal 323 to the second input port 312 by judgement of the first judgement signal 321 and the second judgement signal 322. The first judgement signal 321 is supplied by the information reading leg "IORD", and the second judgement signal 322 is supplied by an undefined leg "A6" of the wireless network card 10. When the undefined leg "A6" has a high potential, the second judgement signal 322 has a high potential, which indicates that a control value exists in the legs A2 to A5. At this time, when the information reading leg has a high potential, the first judgement signal 321 has a high potential, so that the judgement device 32 may output a high potential signal to function as the enabling signal 323 so as to drive the buffer 31.

In summary, the buffer 31 will be driven only when both of the information reading leg and the undefined leg have a high potential, so as to light one, some or all of the LEDs. Thus, when the wireless network card 10 is transmitting or receiving the signal and the control value is produced, the drive circuit 30 may be operated to decide if the LED is lighted.

Accordingly, by the design of the present invention, the indication of the multiple indication members 11 may be changed according to the strength of the local RF signal. In addition, the multiple indication members 11 also have other functions. For example, the multiple indication members 11 may have corresponding indication according to the practical linking state of the instant network, thereby informing the user that the instant network is in connection or is disconnected.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A method for directly indicating the strength of a signal for a wireless network card using a PCMCIA interface having a medium access control (MAC) layer, the wireless network card being provided with multiple indication members, the method comprising the steps of:

(a) initializing the wireless network card, and allocating multiple I/O address spaces;

(b) querying the information records of the medium access control (MAC) layer of the PCMCIA interface, to obtain a signal strength value;

(c) determining a control value according to the signal strength value; and (d) sending the control value to the multiple I/O address spaces, to control operation of the multiple indication members.

2. The method for directly indicating the strength of a signal in accordance with claim 1, wherein the step (c) further includes the steps of:

(c1) presetting a range of multiple values; and (c2) comparing magnitudes of the multiple values, to judge the range of the signal strength value of each query, so as to determine the corresponding control value of the signal strength value.

3. A wireless communication device for directly indicating the strength of a signal, comprising multiple properly arranged indication members provided thereon, a drive circuit provided therein and connected with the indication members for driving the indication members, and a PCMCIA interface connected with the drive circuit, wherein the PCMCIA interface provides a signal strength value corresponding to the strength of a radio frequency (RF) signal and determines a control value according to the signal strength value, and the drive circuit obtains the control value to decide the number of the indication members to be driven according to the control value, and wherein the drive circuit includes a buffer including a first input port for inputting the control value, a second input port for inputting an enabling signal , which is obtained from an information reading leg of the PCMCIA interface and the potential of the information reading leg is determined by the RF signal transmitting and receiving conditions of the PCMCIA interface, and an output port for connecting to the indication members, so that the buffer decides the number of the indication members to be driven according to the enabling signal and the control value.

4. The wireless communication device for directly indicating the strength of a signal in accordance with claim 3, wherein the indication members are arranged in a linear manner, and each of the indication members has an indication zone, and the sizes of the indication zones are increased from a middle toward two sides.

5. The wireless communication device for directly indicating the strength of a signal in accordance with claim 3, wherein the drive circuit further includes a judgement device for inputting a first judgement signal and a second judgement signal, so that the judgement device outputs the enabling signal to the second input port by judgement of the first judgement signal and the second judgement signal, wherein the first judgement signal is supplied by the information reading leg, and the second judgement signal is supplied by an undefined leg of the the PCMCIA interface, the potential of the information reading leg is determined by the signal transmitting and receiving conditions of the PCMCIA interface, and the potential state of the undefined leg of the PCMCIA interface decides whether the value of the first input port is the control value.

6. The wireless communication device for directly indicating the strength of a signal in accordance with claim 5, wherein each of the indication members is an LED.

* * * * *